(12) United States Patent
Araki et al.

(10) Patent No.: US 6,646,767 B1
(45) Date of Patent: Nov. 11, 2003

(54) IMAGE SCANNING APPARATUS HAVING A ROTATING SHAFT COUPLING

(75) Inventors: Takao Araki, Fukuoka (JP); Junichi Suematsu, Fukuoka (JP); Kosuke Takaki, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/551,062

(22) Filed: Apr. 18, 2000

(30) Foreign Application Priority Data

Apr. 20, 1999 (JP) .......................................... 11-112072

(51) Int. Cl.$^7$ ................................................ H04N 1/04
(52) U.S. Cl. ...................... 358/474; 358/496; 358/462; 264/267; 264/273
(58) Field of Search ................................. 358/474, 496, 358/497, 462, 464; 264/267, 273

(56) References Cited

U.S. PATENT DOCUMENTS 5,453,850 A * 9/1995 Akuzawa et al. ............. 355/67
5,876,288 A * 3/1999 Jaskowiak .................. 464/181

FOREIGN PATENT DOCUMENTS

| JP | 6-67173 | 8/1994 |
| JP | 10-350107 | 12/1998 |
| JP | 11-327221 | 11/1999 |

* cited by examiner

Primary Examiner—Edward Coles
Assistant Examiner—Heather D Gibbs
(74) Attorney, Agent, or Firm—RatnerPrestia

(57) ABSTRACT

A rotating shaft coupling has a plurality of rotating-shaft-coupling-members. One of the rotating-shaft-coupling-members is multi-layered by a coupler connecting a shaft thereto, an elastic body and an inertia body which has a mass activating a torsion load in a rotating direction when the elastic body is rotating. A plurality of the rotating-shaft-coupling-members are assembled into the rotating shaft coupling. By this construction, transmission of the vibration from a motor side to a driven side can be effectively suppressed.

5 Claims, 5 Drawing Sheets

IMAGE SCANNING APPARATUS HAVING A ROTATING SHAFT COUPLING

FIELD OF THE INVENTION

The present invention relates to an image scanning apparatus having a scanning carriage driving system for reading image data. It relates particularly to the image scanning apparatus having a rotating shaft coupling, for example, it is assembled between a stepping motor shaft of a driving side and a shaft of a driven side. It is composed to suppress transmission of a vibration from the motor shaft side to the driven side in the scanning carriage driving system.

BACKGROUND OF THE INVENTION

The image scanning apparatus is used for example for an electronic filing which stores a lot of various kinds of documents as image data. A image scanner has been used conventionally as the image scanning apparatus. Well known type of image scanners is a flat-bed type in which a document is put on a document table made of glass by hand-setting and an automatic document feeder (ADF) type in which comparatively small sized documents are automatically fed.

Such an image scanning apparatus usually has the scanning carriage driving system for reading image data. As a driving source of the scanning carriage driving system, a stepping motor is frequently used but the vibration and the periphery speed fluctuation of the motor shaft transmit to the carriage. By this reason, while the carriage scans under the document table, the moving speed fluctuates slightly as a result, the scanned image may be unclear or may have a distortion.

One of the means to suppress the transmission of the vibration from the stepping motor to the driven side is to provide a damper on the motor shaft as described in Japanese Patent Application Examined Publication No.H6-67173. The damper is composed of a ring-shaped metal flange around the motor shaft, an elastic body made of rubber that is disposed around the entire outer periphery and an inertia body made of metal unifying into the entire outer periphery of the elastic body. In such a damper, the motor shaft rotates smoothly in a wide range from a low velocity to a high velocity. The elastic body uniformly transmits a rotation force of the motor shaft to the inertia body. Then the inertia body vests a repulsion force against the rotation force of the motor shaft and moreover the inertia body itself suppresses a damped vibration of a transient response characteristic of the motor without being a vibrator.

Thus, the transmission of the vibration to the carriage is suppressed by attaching the damper like above-described on the shaft of the stepping motor. Therefore, the image scanning performance improves comparing with the case of direct coupling between the motor shaft and the driven side.

The damper which was disclosed in the above Examined Publication describing forcibly suppresses the vibration of the motor shaft by operating the elastic body and inertia body, and also damps the vibration for the motor side which acts as the vibrating source, thus enables to reduce the effect on the driven side.

However, the vibration of the motor is due to a rotation of a rotor which is generally heavier than a motor shaft. The vibration of the motor can not be completely suppressed even if the vibration of the motor shaft is suppressed to some degree. Then the motor shaft is directly coupled to the driven side through a coupling or connected to the driven side through a gear train or a belt for speed reduction, any factor to damp the vibration is not included between the motor shaft and the driven side. Therefore, a residual component of the vibration of the motor which was unable to suppress by the damper is transmitted to the driven side through the motor shaft.

Thus, the construction in which the motor shaft is connected to the driven side by providing the damper around the motor shaft, it is impossible to sufficiently suppress the transmission of the vibration to the driven side. Due to this, there was a limitation in improving the scanning accuracy of the image even if such a damper is assembled in the carriage driving system whose main focus is uniformity and stability of the scanning speed.

SUMMARY OF THE INVENTION

The present invention aims to offer the image scanning apparatus with a good image scanning is possible by effectively suppressing the transmission of the vibration from the motor side to the driven side and assembling the rotating shaft coupling which can make the action of the driven side stable in the carriage driving system.

An image scanning apparatus of the present invention comprises:

(a) a document table for putting a document on;
(b) a carriage having a scanning module for reading an image data of the document by scanning the document;
(c) a driving mechanism for driving the carriage; and
(d) a rotating shaft coupling assembled in the driving mechanism;

wherein the rotating shaft coupling has a plurality of rotating-shaft-coupling-members, one of the rotating-shaft-coupling-members being multi-layered by a coupler connecting a shaft thereto, an elastic body and an inertia body which has a mass activating a torsion load in a rotating direction when the elastic body is rotating, and a plurality of the rotating-shaft-coupling-members are assembled into the rotating shaft coupling.

According to this construction, even if the driving motor of the driving mechanism is a stepping motor, the vibration from the motor side is not transmitted to the driven side and moreover a smooth rotation at the driven side can be obtained and the mechanical parts of the driven side can be functioned with a high accuracy.

DETAILED DESCRIPTION OF THE INVENTION

Figure 1:
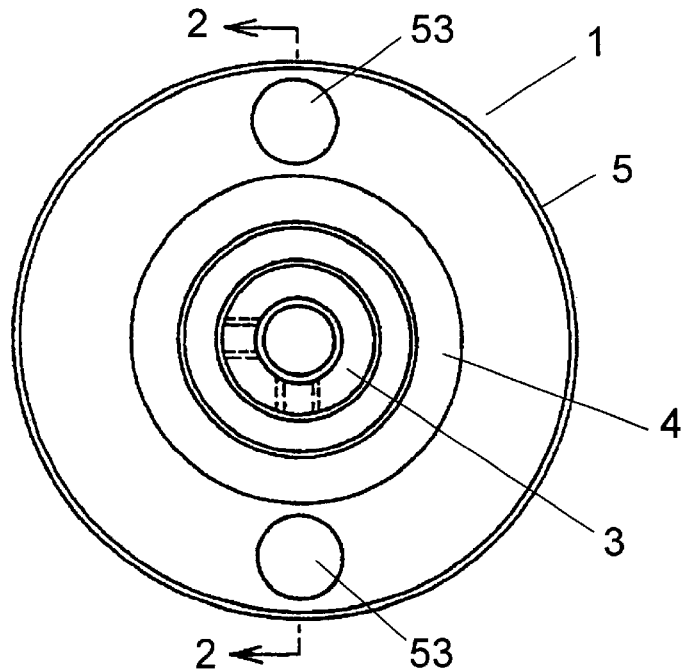
FIG. 1 is a front view of a rotating shaft coupling used in an image scanning apparatus in accordance with an exemplary embodiment of the present invention looking to an axial direction.

The image scanning apparatus of the flat bed type is already filed in Japanese Patent Applications No.H10-128545 and No.H10-350107 by the same applicant as this application.

In such a kind of image scanning apparatus, the scanning module for optically scanning the entire area of a document table is assembled in a main frame in order to read the image data from the document on the document table. The scanning module is mounted on the carriage which moves and is guided by guide shafts which are disposed in parallel under the document table. As an element for driving the carriage driving system, a stepping motor is generally used.

The stepping motor is used not only in the field of the image scanning apparatus but in various kinds of field as a driver. It accompanies the vibration and resonance phenomenon while driving. The vibration load from the driving shaft side to the driven shaft side frequently becomes problems while designing. For example, if the stepping motor is used for driving the carriage driving system, the vibration and the peripheral speed fluctuation of the motor shaft at the driving side will be transmitted to the carriage. Accordingly, the moving speed of the carriage when it scans the document table, it fluctuates although it is very small, the scanned image may become unclear or may occur distortion, therefore, a further improvement is desired.

The present invention is aimed to improve the above problem. An exemplary embodiment of the present invention is explained below, referring to the drawings.

Figure 2:
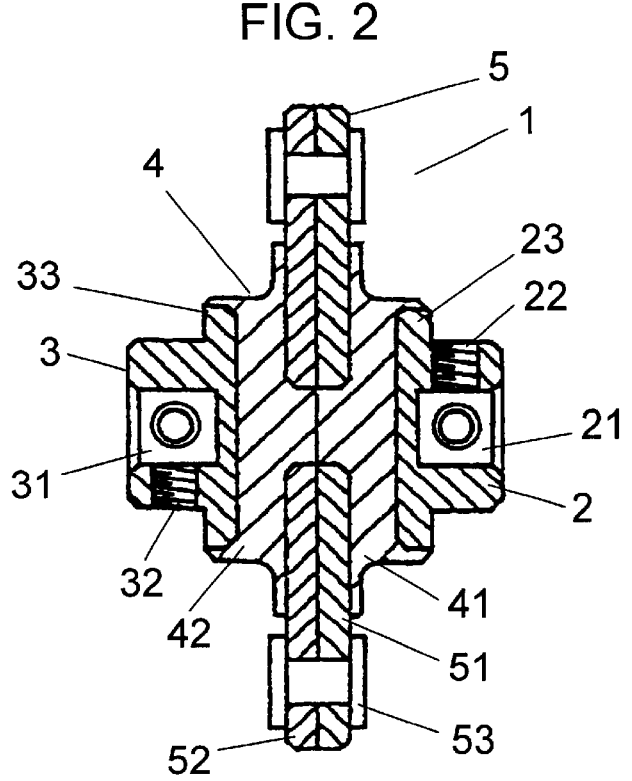
FIG. 2 is a vertical cross section view of the rotating shaft coupling cutting by a line A—A shown in FIG. 1.

FIG. 1 is a front view of the rotating shaft coupling used in the image scanning apparatus in accordance with the exemplary embodiment of the present invention looking at an axial direction. FIG. 2 is a vertical cross section view of the rotating shaft coupling cutting by a line A—A shown in FIG. 1.

In the both drawings, a rotating shaft coupling 1 is composed of an input side coupler 2 coupled to a motor shaft described later, an output side coupler 3 which is disposed coaxially with a space next to the input side coupler 2 and is coupled to the driven side shaft, an elastic body which is disposed in between the input side coupler 2 and the out side coupler 3, and an inertia body 5 which is coaxially coupled to the input side coupler 2 and the output side coupler 3 through the elastic body 4. The input side coupler 2 and the output side coupler 3 are common parts made of, for example brass.

The input side coupler 2 has a coupling hole 21 in which the motor shaft is inserted, an internal thread hole 22 provided on the peripheral wall of the coupling hole 21 and a flange 23 formed on the periphery of the coupling hole 21 at the base end side and is buried in an elastic body layer 41. The output side coupler 3 has a coupling hole 31 in which the driven side shaft is inserted, an internal thread hole 32 provided on the peripheral wall of the coupling hole 31 and a flange 33 formed on the periphery of the coupling hole 31 at the base end side and is buried in the elastic body layer 42.

The elastic body layers 41 and 42 are made of a material such as nitrile rubber, butyl rubber or silicone rubber and are united into one piece with the flange 23 of the input side coupler 2 and the flange 33 of the output side coupler 3, respectively. The inertia body 5 is made of brass similar to the input side coupler 2 and the output side coupler 3 and is disk-shaped having an opening at the center.

The rotating shaft coupling 1 is comprised with 4 pieces, which are the input side coupler 2, the output side coupler 3, the elastic body 4 (41 and 42) and the inertia body 5 (51 and 52). It can be made to be one piece by fixing the couplers 2 and 3 at predetermined positions in a mould for manufacturing, pouring melted rubber into the mould and then cure the melted rubber. On the other hand, the exemplary embodiment shown in FIG. 1 and FIG. 2, the elastic body 4 is divided into a first elastic body layer 41 and a second elastic body layer 42 and the inertia body 5 is divided into a first inertia body layer 51 and a second inertia body layer 52. In another words, a piece is made of the input side coupler 2, the first elastic body layer 41 and the first inertia body layer 51. Another piece is made of the output side coupler 3, the second elastic body layer 42 and the second inertia body layer 52. These two pieces are constructed to be unified by two rivets 53 which are passed through between the first inertia layer 51 and the second inertia layer 52. Thus, even in the case in which the rotating shaft coupling 1 is to form by unifying two pieces, the elastic body 4 made of the first elastic body layer 41 and the second elastic body layer 42 which is formed between the input side coupler 2 and the output side coupler 3. The inertia body 5 made of the first inertia body layer 51 and the second inertia body layer 52 is formed between elastic body layers. The inertia body 5 has a mass which urges to demand a torsion load in a rotating direction of the elastic body 4 during rotation.

Figure 3:
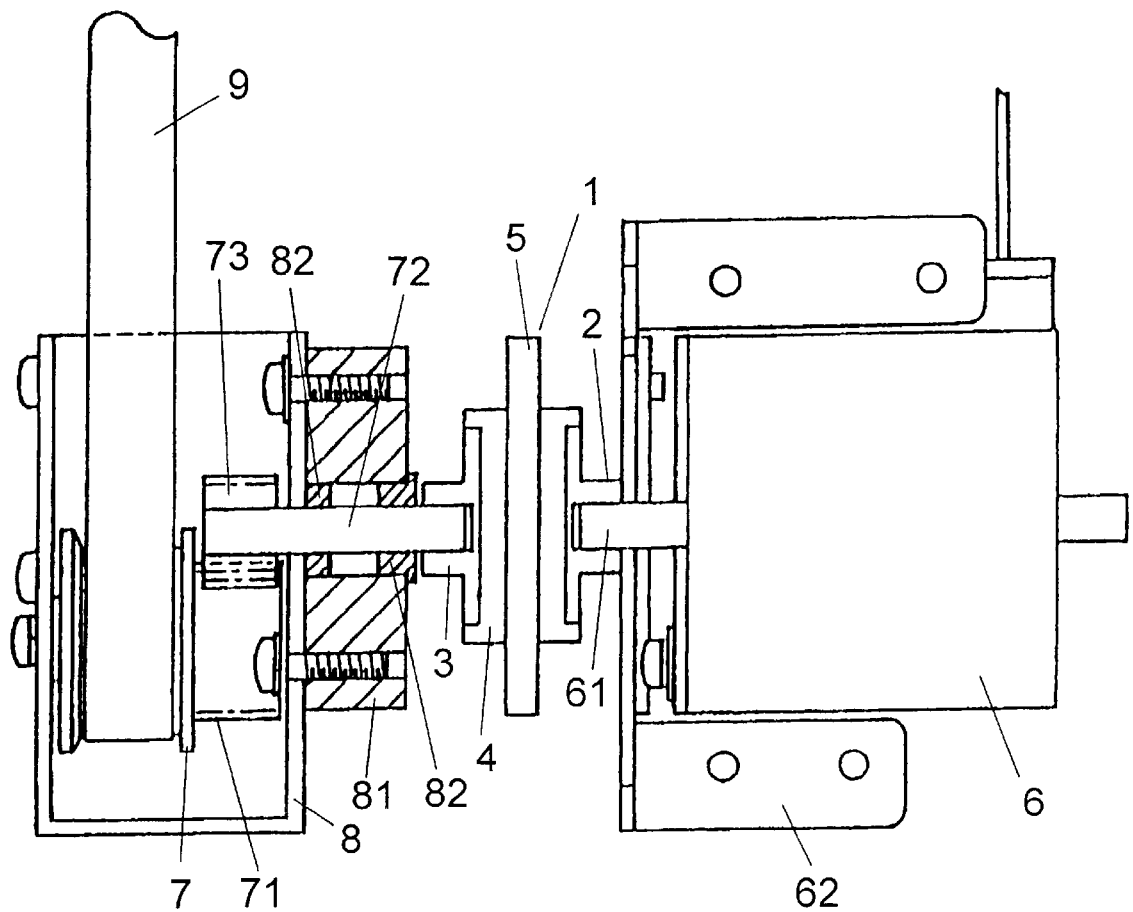
FIG. 3 is a plan view illustrating an example of disposing the rotating shaft coupling between a driving motor shaft and a driven shaft of a belt drive mechanism using a pulley.

FIG. 3 is a plan view showing an example of disposing the rotating shaft coupling between the driving motor shaft and the driven shaft of a belt drive mechanism using a pulley.

In FIG. 3, a driving motor 6 included in the driving side is mounted on a mount 62. The pulley 7 which is included in the driven side is held by a base 8 with rotation free. The motor 6 and base 8 are disposed at the positions to face each other. The pulley 7 makes a gear 71 to be unified into one piece and makes the shaft of the gear 71 to be connected to the base 8 with rotation free and a loop-belt 9 is wound on the pulley 7. A bearing block 81 is mounted to the side of the base 8 facing to the motor 6 and the driven shaft 72 is supported by a built-in ball bearing 82. The driven shaft 72 has a pinion 73 gearing with the gear 71 of the pulley 7 and is disposed on the same axis as the motor shaft 61. The rotating shaft coupling 1 is assembled in between the motor shaft 61 and the driven shaft 72.

The motor shaft 61-is inserted into the coupling hole 21 of the input side coupler 2 of the rotating shaft coupling 1. A screw (not shown in the drawing) is screwed into a internal thread hole 22 shown in FIG. 2 until the tip of the screw touches the peripheral wall of the motor shaft 61 and then the connection between the input side coupler 2 and the motor shaft 61 is completed. On the other hand, the driven shaft 72 is inserted to the coupling hole 31 of the output side coupler 3 then a screw (no shown) is screwed into the internal thread hole 32 to complete the connection.

Thus, a smooth rotation of the driven shaft 72 can be obtained as well as transmission of the vibration of the motor 6 to the driven shaft 72 is prevented by disposing the rotating shaft coupling 1 between the motor shaft 61 and the driven shaft 72. In another words, the rotating shaft coupling 1 has the elastic body 4 between the input side coupler 2 and the output side coupler 3. Even if the vibration from the motor 6 is transmitted to the input side coupler 2 which is directly connected to the motor 61, the transmission of the rotation to the output side coupler 3 is sent through the elastic body 4. Thus the vibration from the motor 6 is also transmitted to the elastic body 4 and is damped there. Therefore, the vibration is prevented to be transmitted to the output side coupler 3 as a result, the driving mechanism from the driven shaft 72 to the pulley 7 and the belt 9 wound on the pulley 7 are not effected by the vibration of the motor 6.

When the stepping motor is used as the driving motor 6, the motor shaft 61 causes a damped vibration every pulse moves forward. This vibration is transmitted to the input side coupler 2 which is directly coupled to the motor shaft 61. At that time, the inertia body 5 held by the elastic body 4 puts a torsion load on the elastic body 4 towards to the rotating direction because it tries to continue to rotate by the inertia of the rotation. The elastic body 4 receiving this torsion loads try to reverse the direction of the rotation to restore, it tries to make the inertia body 5 rotates inversely. Due to the behavior of the inertia body 5, a repulsive force of the inverse rotation is occurred against the normal damped vibration of the rotating direction in the rotating shaft coupling. A replusive force of the normal rotating direction will occur against the damped vibration of the inverse rotating direction. Therefore, it enables to obtain a superb response in stepping motion by damping the vibration to the stepping angle of the stepping motor.

Therefore, even if the motor 6 is a stepping motor, the rotation of the motor shaft 61 can smoothly rotate the driven shaft 72 in a wide range from a low velocity to a high velocity through the rotating shaft coupling 1.

The image scanning apparatus of the present invention, the vibration of the driving motor 6 will not be transmitted to the pulley 7 side by providing the rotating shaft coupling 1. Therefore, the belt 9 runs in a stable state without accompanying vibration, holding the predetermined tension. The driven shaft 72 can be smoothly rotated always because of an action due to the elastic body 4 and the inertia body 5 which is disposed around the elastic body 4 even if the motor 6 is a stepping motor, it does not cause even a small speed fluctuation which is caused by the belt 9.

Figure 4:
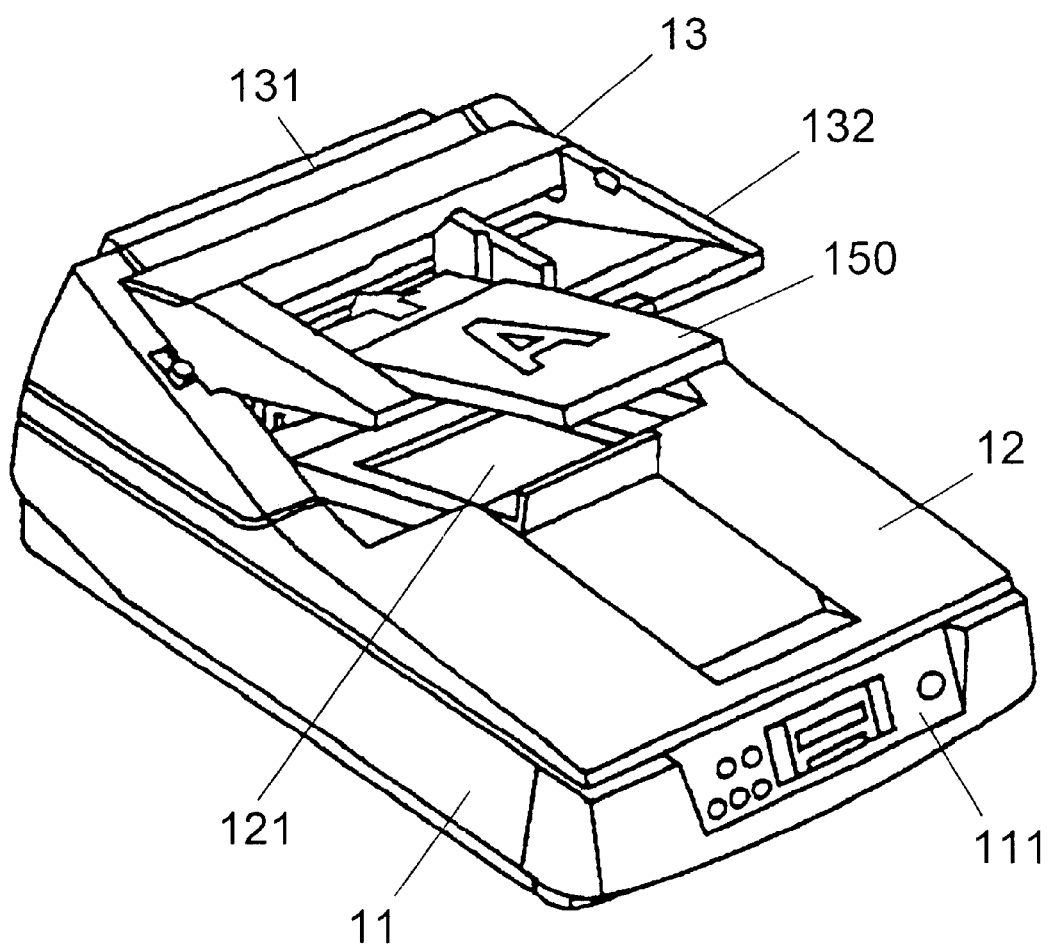
FIG. 4 is an outline perspective view of the image scanning apparatus in accordance with an exemplary embodiment of the present invention assembling the rotating shaft coupling in a carriage driving mechanism.
Figure 5:
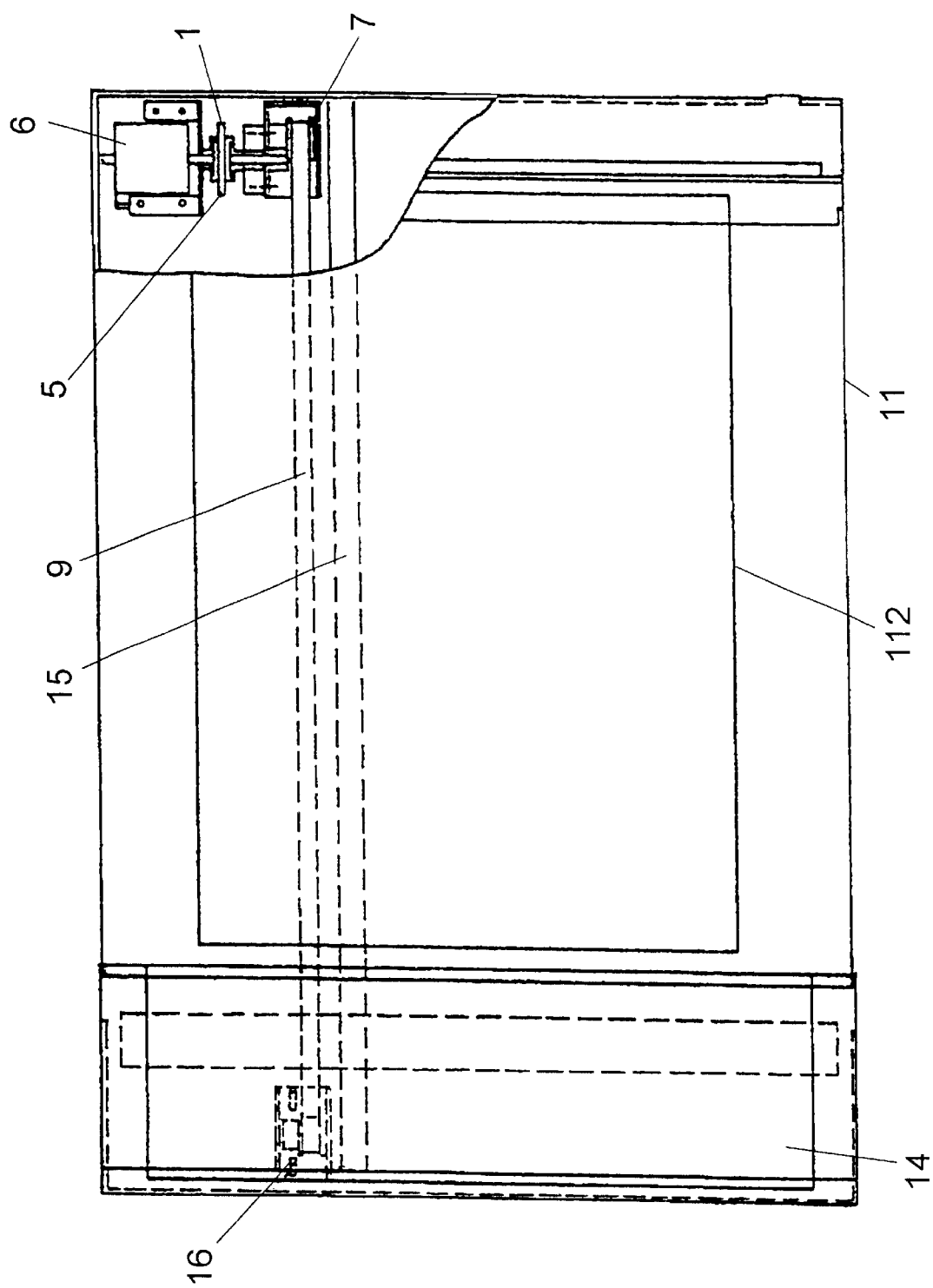
FIG. 5 is a top plan and broken view of a part of the image scanning apparatus.

FIG. 4 is an outline perspective view of the image scanning apparatus in accordance with the exemplary embodiment of the present invention assembling the rotating shaft coupling in the carriage driving mechanism and FIG. 5 is a top plan and broken view of a part of the image scanning apparatus.

The image scanning apparatus comprises a main frame 11 of the apparatus with an optical scanning module (described later), a document case cover 12 attached on the main frame of the apparatus 11 with easy opening/closing and an automatic document feeder 13 on which document sheets are disposed and are fed automatically.

The main frame 11 of the apparatus has an operation panel 111 in front of the apparatus, a controller (not shown in the drawing) for controlling all the functioning parts in the main frame 11 and a document table 112 made of transparent glass for scanning large-sized sheets. The automatic document feeder 13 has a housing 131, a hopper unit 132 attached on the top of the housing 131 and a feeding mechanism for feeding document sheets 150 in a direction indicated with a thick arrow shown in FIG. 4. Using the automatic document feeder 13, the document sheet 150 which is fed towards the arrow direction, moving forward in a traveling guide, detouring along the top surface of the rear end side of the main frame and then forced out in an exit tray 121 which is provided on the document cover 12.

Inside the main frame 11, a carriage 14 with a scanning module (not shown in the drawing) for reading the image data on documents is disposed as shown in FIG. 5. The scanning module of the carriage 14 is an optical image scanner system using a well-known CCD (charge coupled device). The carriage 14 is slidably held by the guide shaft 15 which is disposed from the near operation panel 111 in front side of the main frame 11 to the near rear side of the main frame 11.

The driving mechanism including the driving motor 6 and the base 8 supporting the pulley 7 shown in FIG. 3 is assembled side of the operation panel 111 of the inside main frame 11. The belt 9 is bridged over between the pulley 7 and the driven pulley 16 which is disposed rear side of the main frame 11 of the apparatus. The carriage 14 is supported by this belt 9.

Figure 6A:
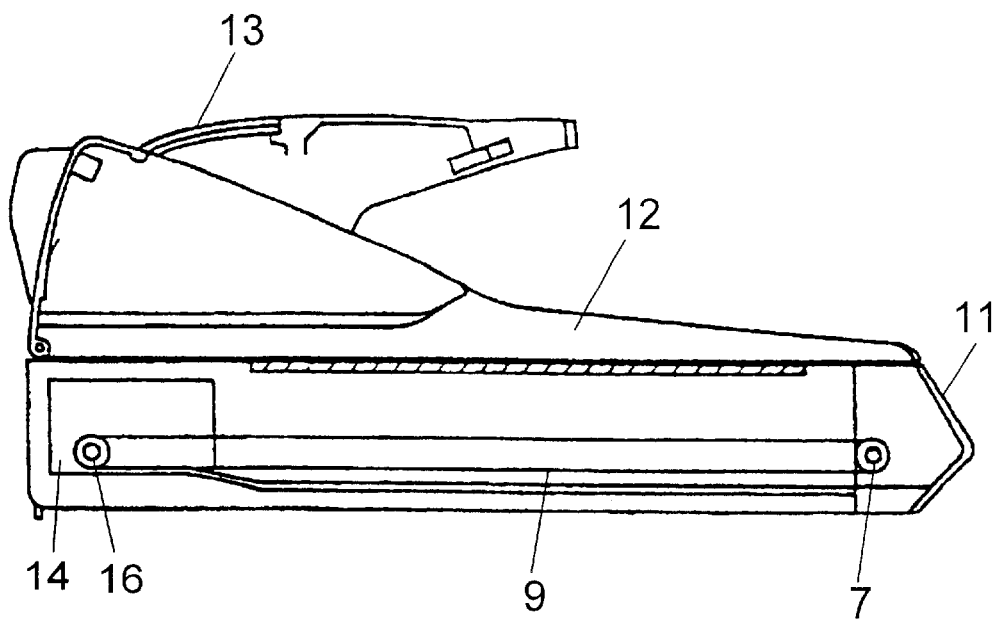
FIG. 6A is an outline view of the image scanning apparatus indicating a stopping position of a carriage in an automatic document feeding mode.
Figure 6B:
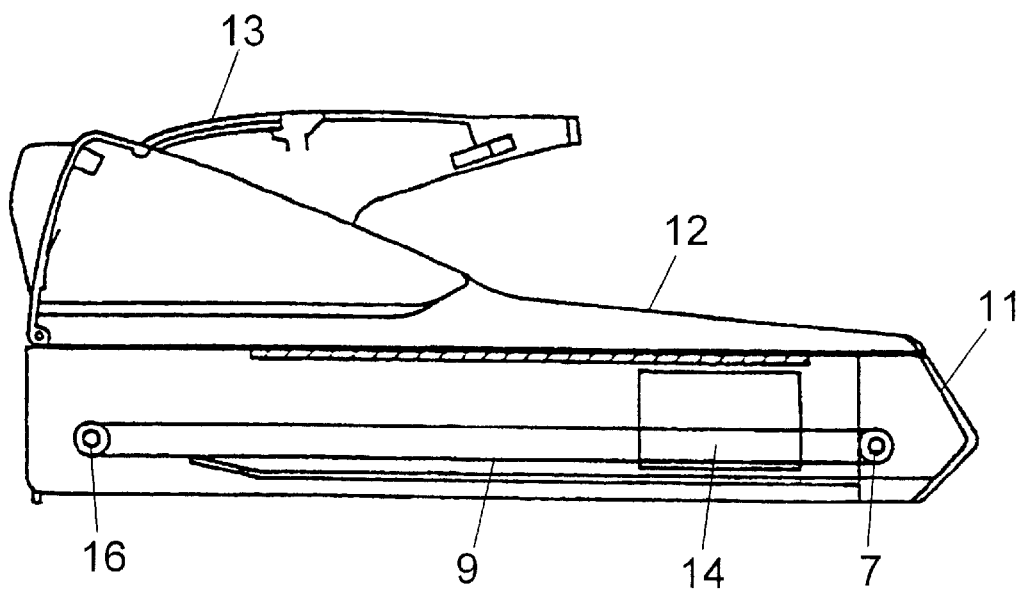
FIG. 6B is an outline view of the image scanning apparatus indicating a starting position setting of the carriage in an image scanning mode scanning a document on a document table.

FIG. 6A is an outline view of the image scanning apparatus indicating a stopping position of the carriage in the automatic document feeding mode and FIG. 6B is an outline view of the image scanning apparatus indicating a starting position setting of the carriage in the image scanning mode for scanning a document on the document table.

In the above-described image scanning apparatus, the carriage 14 stops at the left end of the main frame 11 as shown in FIG. 6A in the automatic document feeding mode using automatic document feeding apparatus 13. In this automatic document feeding mode, the scanning module built in the carriage 14 scans the image of the document 150 when the document 150 is traveled from the hopper unit 132.

In the scanning mode and reading the image data from, for example a large-sized document on the document table 112, the carriage 14 is moved from the position at the rear end shown in FIG. 6A to the position in the most front end of the document table shown in FIG. 6B by operating the driving motor 6. The position of the carriage 14 shown in FIG. 6B is a starting point. The image data is read by moving the carriage 14 to the left side.

Scanning and reading a document on the document table 112 by moving the carriage 14, the belt 9 is driven and moved by the driving mechanism including the rotating shaft coupling 1 in accordance with the exemplary embodiment shown in FIG. 3. Therefore, the vibration of the motor 6 is not transmitted to the pulley 7 and the belt 9, thus the belt 9 runs smoothly without any small vibrations due to the intervention of the rotating shaft coupling in accordance with the exemplary embodiment as explained in FIG. 3. Even if the motor 6 is a stepping motor, due to the elastic body 4 and the inertia body 5 of the rotating shaft coupling 1, the driven shaft 72 always rotates smoothly and the belt 9 runs without any fluctuation in its running speed. Therefore, the carriage 14 moves without any swing and always maintains a stable running speed and can accurately scan the image of the document on document table 112.

As explained above, in the image scanning apparatus of the present invention, even if the driving motor of the driving mechanism is a stepping motor, the vibration from the motor side does not transmit to the driven side, a smooth rotation of the driven side can be obtained and the mechanical parts of the driven side can accurately work.

What is claimed is:

1. An image scanning apparatus comprising:

(a) a document table for putting a document on;

(b) a carriage having a scanning module for reading an image data of the document by scanning the document;

(c) a driving mechanism for driving said carriage; and (d) a rotating shaft coupling assembled in said driving mechanism;

wherein said rotating shaft coupling has a plurality of rotating-shaft-coupling-members, one of said rotating-shaft-coupling-members being multi-layered by a coupler connecting a shaft thereto, an elastic body and an inertia body which has a mass activating a torsion load in a rotating direction when said elastic body is rotating, and a plurality of said rotating-shaft-coupling-members are assembled into said rotating shaft coupling, wherein each of said rotating-shaft-coupling members is comprised so that said coupler, said elastic body and said inertia body are multi-layered.

2. An image scanning apparatus as recited in claim 1, wherein said rotating-shaft-coupling-members are coupled so that inertia bodies face each other.

3. An image scanning apparatus as recited in claim 1, wherein a plurality of said rotating-shaft-coupling-members are coupled so that inertia bodies face each other in plane symmetry.

4. An image scanning apparatus as recited in claim 1, wherein said rotating shaft coupling is composed so that said couplers, said elastic bodies and said inertia bodies are coaxially disposed.

5. An image scanning apparatus as recited in claim 1, wherein each of said elastic bodies is the same.

* * * * *